UNITED STATES PATENT OFFICE.

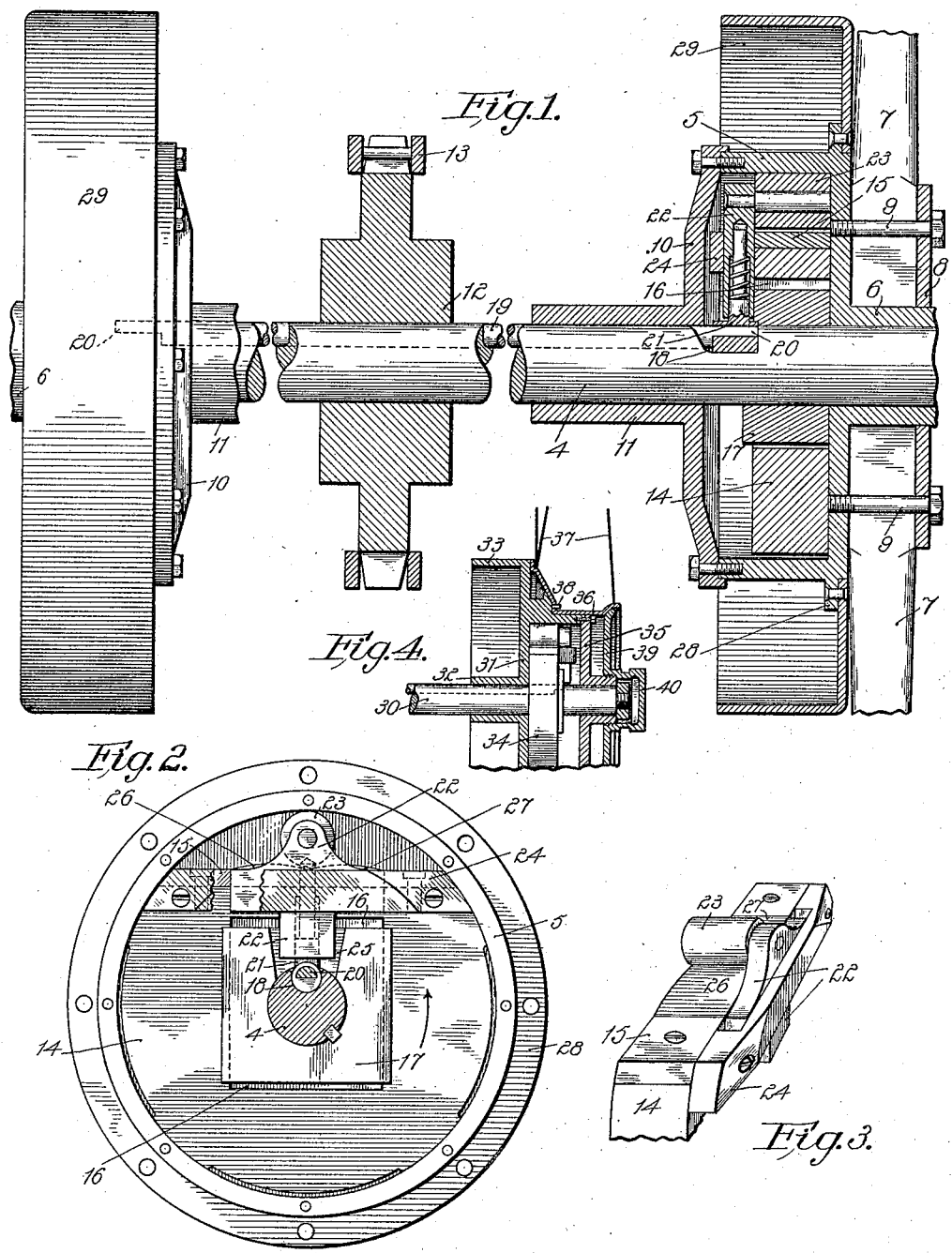

WILLIAM LUXMORE, OF CHICAGO, ILLINOIS.

VEHICLE DRIVING MECHANISM.

1,178,657.  Specification of Letters Patent.  Patented Apr. 11, 1916.

Application filed December 29, 1913. Serial No. 809,220.

*To all whom it may concern:*

Be it known that I, WILLIAM LUXMORE, a citizen of the United States, residing at Chicago, in the county of Cook and State of Illinois, have invented certain new and useful Improvements in Vehicle Driving Mechanism, of which the following is a full, clear, concise, and exact description, reference being had to the accompanying drawings, forming a part of this specification.

My invention relates to vehicle driving mechanism and its object is to provide improved mechanism of this class which is of sturdy construction and which is capable of being economically manufactured.

The construction of my improved driving mechanism is such that the driving wheels of a vehicle with which the mechanism is associated are permitted to revolve at different speeds, as for instance, when the vehicle turns a corner or otherwise departs from a straight line of travel, and this result is secured without employing any one of the several forms of differential gears which have been almost universally employed in the past to secure this result.

My invention will be more clearly understood by referring to the accompanying drawings, in which—

Figure 1 is a view, partly in elevation and partly in section, illustrating an automobile driving mechanism embodying my invention; Fig. 2 is an elevational view of that portion of the mechanism associated with one of the driving wheels; Fig. 3 is a perspective view of a portion of one of the disks with which each of the wheels is provided and the roller which bears on the disk and which at certain times serves to lock the disk to the drum within which it is disposed, and Fig. 4 is a view partly in section and partly in elevation of a slightly modified embodiment of my invention.

Similar reference numerals refer to similar parts throughout the several views.

Referring to Fig. 1, I have illustrated at 4 a vehicle axle upon which the vehicle driving wheels are arranged to be mounted. Loosely mounted upon the axle are the driving wheels, each of which comprises a drum 5 having an integral hub 6. Radiating from the hubs 6 are the spokes 7 which are securely clamped in position between rings 8 and drums 5 by means of suitable bolts 9 which pass through the rings 8 and have threaded engagement with the drums. Each of the drums 5 has secured thereto a plate 10 for closing the open side of the drum, each of said plates comprising a hub 11 loosely mounted upon the axle 4. Any suitable means may be provided for driving the axle 4, as for instance the chain drive mechanism illustrated in the drawings, this mechanism comprising a sprocket wheel 12 keyed upon the axle 4 and a chain 13 engaging the teeth of the sprocket wheel, said chain being operatively connected to and driven from the vehicle power plant. Disposed within each of the drums 5 is a disk 14 having a portion of its periphery cut away. Secured to the cut-away portion of the disk is a bearing plate 15 of hardened steel or other suitable material. Each of the disks 14 has a rectangular opening 16 therethrough, in which is disposed a block 17 which is keyed to the axle 4, as illustrated in Fig. 2. Each of the blocks 17 may, if desired, comprise flanges bearing against the inner face of its associated disk 14, as illustrated.

The axle 4 is provided with a longitudinal slot 18 in which is carried a rocker-shaft 19. The rocker-shaft is provided with reduced end portions 20 of substantially semi-circular cross-section, which reduced portions engage in corresponding openings in rocker arms 21. Telescopically mounted upon each of the rocker arms 21 is a head 22 which at its outer end has secured thereto a roller 23 disposed between the plate 15 of its associated disk 14 and the inside of the drum 5, a suitable spring being interposed between the rocker arm 21 and head 22 to normally hold the head in the position illustrated in the drawings. Secured to each of the disks 14 is a guide 24 for one of the heads 22.

In the embodiment of my invention herein illustrated, the blocks 17 are recessed at 25 to accommodate the rocker arms 21 and the heads 22. As clearly shown in Figs. 2 and 3, the plates 15 are each provided with integral cam portions 26 and 27, the function of which will hereinafter be made apparent. The drums 5 are provided with annular flanges 28, to which are secured the brake drums 29, as shown.

Having now described the structure of the driving mechanism of my invention, I will now explain the operation thereof: Let us assume that to drive the vehicle in a forward direction the axle 4 is rotated in the direction indicated by the arrow in Fig.

2. As the axle is so rotated, the block 17 and disks 14 at each end of the axle will also be rotated. When this occurs the rollers 23 are clamped between drums 5 and the cam portions 27 of the disk-carried plates 15. When the rollers are so clamped, each of the disks is, of course, locked to its associated drum, and the wheel of which the drum forms a part is positively driven from the axle 4 upon which it is located. As the vehicle departs from a straight line of travel, one of the driving wheels will rotate faster than the other, as is well known to those skilled in the art. When this occurs, the drum 5 of the faster-rotating driving wheel is permitting to travel ahead of its disk 14, the other drum 5 being positively driven from the axle, as before. On account of the rocker shaft connecting the rollers 23, anything but simultaneous movement of the rollers is prevented and the roller associated with the faster-moving wheel is held in position to lock its associated drum 5 to its disk 14, when the rates of rotation of the drums are again the same—that is, when the vehicle is again moving in a straight line. If the axle 4 is driven in the reverse direction to move the vehicle backward, the same operation takes place, except that at this time the rollers 23 are clamped between the drums 5 and the cam portions 26 of the disk-carried plates 15.

Let us now assume that the vehicle is traveling down hill with the engine driven from the driving wheels through the transmission mechanism, if desired. If, in such a case, the machine is traveling forward, the rollers are clamped between drums 5 and the cam portions 26. If when the rear axle is being driven from the wheels, as set forth, the direction of the vehicle is changed, the shaft continues to rotate with the drum carried by the faster-revolving wheel, the disk 14 associated with the slower wheel being adapted to rotate ahead of its drum. When this occurs, the roller 23 associated with the slower wheel is, on account of the rocker arm 19, prevented from slipping back to be clamped between the drum 5 and the cam portion 27. When the rollers 23 are clamped between the cam portions mentioned and the drums 5 a stress is exerted upon each of the disks which tends to move it from its position concentric with the axle 4. If the disks were rigidly mounted upon the axle there would be a tendency to distort the shaft when either of the disks was clamped to its drum 5. By permitting relative movement of the blocks 17 and the disks 14 I secure an arrangement wherein there is no such tendency to distort the axle. Whatever strain is exerted upon the cut-away portion of one of the disks through its locking roller is taken up by the opposite flange portion of the drum 5 within which the disk is located.

Fig. 4 illustrates a modified form of my invention, the wheel shown in this view being of the wire spoke type. In this view an axle is shown at 30, which has loosely mounted upon each end thereof a drum 31 which comprises an integral hub 32 and a flange 33 arranged to serve as a brake drum. Disks 34 are mounted upon shaft 30 as the disks 14 of Figs. 1 and 2 are mounted on shaft 4. The disks are provided with locking rollers, carried by connected rocker arms, as in the embodiment illustrated in the other figures, except that in this case, the rocker arms are disposed on the outer faces of the disks. The open side of the drum is closed by means of a plate 35 as shown. Disposed around the drum 31 is a ring 36 to which the inner ends of the wire spokes 37 are secured. Dowel pins 38 prevent rotation of the ring 36 upon the drum, and the flange 39 of a hub cap 40 prevents lateral displacement of said ring. This arrangement permits ready access to the contents of the drum 31 from the outside of the wheel by removing plate 35.

While I have described my invention as applicable to vehicles, it is apparent that my invention may be used in power transmissions generally.

What I claim as new and desire to secure by Letters Patent of the United States is:

1. In combination, a rotatable shaft, a pair of wheels loosely mounted upon the shaft, a drum associated with each wheel, a disk disposed in each drum, a polygonal opening in each of said disks, a correspondingly-shaped block disposed in said opening, said disk and block being capable of a small amount of relative movement, each of said disks having a portion of its periphery cut away, a rocker shaft supported by the first shaft, rocker arms carried by the ends of said rocker shaft, and a roller pivotally secured to each of said rocker arms, each of said rollers being disposed between the cut-away portion of one of the disks and the drum within which the disk is disposed.

2. In combination, a rotatable shaft, a pair of wheels loosely mounted upon the shaft, a drum associated with each wheel, a disk disposed in each drum, a polygonal opening in each of said disks, a correspondingly-shaped block disposed in said opening, said disk and block being capable of a small amount of relative movement, each of said disks having a portion of its periphery cut away, a rocker shaft supported by the first shaft, rocker arms carried by the ends of said rocker shaft, and a roller pivotally secured to each of said rocker arms, each of said rollers being disposed between the cut-away portion of one of the disks and the drum within which the disk is disposed, each of said rocker arms comprising a member positively secured to the rocker shaft, a second member adapted to telescope with the first member, and a spring tending to separate said members.

3. In combination, a rotatable shaft, a pair of wheels loosely mounted upon the shaft, a drum associated with each wheel, a disk disposed in each drum, a polygonal opening in each of said disks, a correspondingly-shaped block disposed in said opening, said disk and block being capable of a small amount of relative movement, each of said disks having a portion of its periphery cut away, a rocker shaft supported by the first shaft, rocker arms carried by the ends of said rocker shaft, and a roller pivotally secured to each of said rocker arms, each of said rollers being disposed between the cutaway portion of one of the disks and the drum within which the disk is disposed, each of said disks being provided with a bearing plate secured to the cut-away portion thereof, said bearing plates each comprising a pair of integral cam portions.

4. In combination, a rotatable shaft, a drum loosely mounted upon the shaft, a disk within the drum, said disk having a portion of its periphery cut away, a polygonal hole through the center of said disk, a block disposed in said hole, said block being non-rotatable relatively to the shaft, said block and disk being capable of a small amount of relative movement, and means secured to said shaft extending into the cut-away portions of said disk.

5. In combination, a rotatable axle, a driven member rotatably mounted on said axle, a driving member fixed against rotation on said axle, means operable by the relative movement of said driving and driven members for locking them against relative movement, and means whereby said locking means is normally held positively in operative relation to said rotatable and non-rotatable members to at all times permit one of said members to rotate more rapidly than the other, said shaft and said driving member being capable of a slight amount of relative movement.

6. In combination, a driving shaft having at each end a driven member rotatably mounted on said shaft, and a driving member non-rotatable on said shaft, a rocker shaft carried by said driving shaft, means carried by said rocker shaft for normally locking the drive and driven members against relative movement, a polygonal opening through the center of each of said driving members, a correspondingly-shaped block disposed in each opening, said blocks being non-rotatably secured to the shaft, there being a slight amount of play between each of said blocks and its associated driving member.

7. In combination, a driving shaft having at each end thereof, a driven member rotatably mounted thereon, and a driving member non-rotatable thereon, means at each end of said shaft operable by the relative movement of said drive and driven members for locking them against relative movement, means actuated by said operating means to maintain said locking means in alinement and insure simultaneous movement of said operating means, an opening in each of said driving members, and a block disposed in each opening and held non-rotatable on the shaft, there being a slight amount of play between each block and its associated driving member.

8. In combination, a shaft, a drum loosely mounted upon the shaft, each of said drums having an open face on the side thereof nearest the adjacent end of the shaft, disks within the drums held against rotary movement relatively to the shaft, rocker arms adjacent to the faces of the disks nearest the ends of the shaft, locking means carried by said rocker arms, means connecting the rocker arms, and plates closing the open faces of the drums.

9. In combination, a shaft, a pair of drums mounted upon the shaft, each of said drums having an open side facing the adjacent end of the shaft, driving members secured to the shaft, there being one of said driving members in each of said drums, means for locking the driving members to the drums, and removable plates for closing the open sides of the drums whereby the contents of the drums are readily accessible.

In witness whereof, I hereunto subscribe my name this 27th day of December, A. D. 1913.

WILLIAM LUXMORE.

Witnesses:
ROBERT F. BRACKE,
CAMERON A. WHITSETT.

Copies of this patent may be obtained for five cents each, by addressing the "Commissioner of Patents, Washington, D. C."